Figure 1:
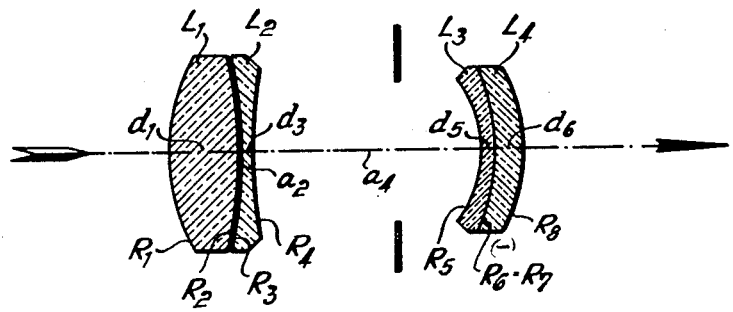

Oct. 22, 1957  A. W. TRONNIER  2,810,322
PHOTOGRAPHIC TELE-OBJECTIVE
Filed Feb. 1, 1956  2 Sheets-Sheet 1

INVENTOR
ALBRECHT WILHELM TRONNIER

BY
Mock & Blum
ATTORNEYS

Oct. 22, 1957 A. W. TRONNIER 2,810,322
PHOTOGRAPHIC TELE-OBJECTIVE
Filed Feb. 1, 1956 2 Sheets-Sheet 2

INVENTOR
ALBRECHT WILHELM TRONNIER

BY Mock + Blum
ATTORNEYS

United States Patent Office 2,810,322
Patented Oct. 22, 1957

2,810,322
PHOTOGRAPHIC TELE-OBJECTIVE

Albrecht Wilhelm Tronnier, Gottingen, Germany, assignor to Voigtlander Aktiengesellschaft, Braunschweig, Germany, a corporation of Germany Application February 1, 1956, Serial No. 562,800

Claims priority, application Germany February 2, 1955

6 Claims. (Cl. 88—57)

This invention relates to a photographic tele-objective and has particular relation to a photographic tele-objective having a front member which is composed of two lenses and includes between a biconvex front lens and a subsequent biconcave lens (which limits the diaphragm space) a diverging pair of adjacent lens surfaces.

The tele-objective according to the present invention is of simple construction and compact structure. It includes a front member which is composed of a converging biconvex lens of low refractive number and a subsequent biconcave lens of high refractive number, said front member being turned towards the longer conjugate. Said front member is followed on the side of the shorter conjugate by a diverging rear member composed of several lenses, as a tele-negative system. The rear member is separated from the front member by an air space containing the diaphragm and the length of said air space is in the range between 18 and 29% of the equivalent focal length of the total objective. The total objective is limited on the image side by a composite diverging meniscus lens in such a manner that the diaphragm space is limited by a strongly diverging negative meniscus of low refractive number with an outer surface which is concave relative to the diaphragm and is followed by a meniscus lens which is likewise concave relative to the diaphragm and is made of a glass of heavy refraction.

This often used structure of photographic tele-objectives shows for medium image angles at larger openings a comatic over-correction, by the aberration values of which, which progressively increase with increasing image angles, the size of the useful image field is limited. A reduction of these comatic aberrations can be attained in objectives of this type only by increasing the curvature of the image field, which progressively increases with an increase of the image angle and therefore likewise causes a limitation of the image field.

It has now been found that according to the present invention the useful image field can be increased without the occurrence of the previously encountered disadvantages.

This is attained by building the tele-objective in accordance with the features disclosed hereinafter. Some embodiments exhibiting these features have been described in the following examples which show by way of example and without limitation some embodiments of and best ways for carrying out the invention.

The appended drawings Figs. 1, 2, 3 and 4 diagrammatically show such embodiments of the invention, the data of which are described in detail hereinafter. Figs. 1–4 are based on a focal length of $f=200$ mm.

In the drawings the reference symbol R denotes the radii of curvature; $d$ denotes the thickness of the lenses, and $a$ the thickness of the air spaces, said reference numerals R, $d$ and $a$ being successively numbered starting on the side of the longer conjugate and proceeding towards the shorter conjugate. The respective data correspond to an equivalent focal length $f=1$. The glasses used are characterized by the refractive numbers $n$ for the yellow light of the $d$-helium-line, while their color dispersion is characterized by the Abbe number $\nu$.

Example 1
(Fig. 1)

[Relative aperture 1:5,5.]

| | | |
|---|---|---|
| $R_1 = +0.1889$ | $d_1 = 0.06634$ | $n_1 = 1.52300$ | $\nu_1 = 59.6$ |
| $R_2 = -0.4733$ | $a_2 = 0.00203$ | | |
| $R_3 = -0.4680$ | $d_3 = 0.01156$ | $n_2 = 1.64769$ | $\nu_2 = 33.9$ |
| $R_4 = +0.6255$ | $a_4 = 0.22206$ | diaphragm space | |
| $R_5 = -0.1103$ | $d_5 = 0.01051$ | $n_3 = 1.52300$ | $\nu_3 = 59.6$ |
| $R_6 = -0.2013$ | cemented | | |
| $R_7 = -0.2013$ | $d_6 = 0.02662$ | $n_4 = 1.67270$ | $\nu_4 = 32.2$ |
| $R_8 = -0.1686$ | | | |

Figure 2:
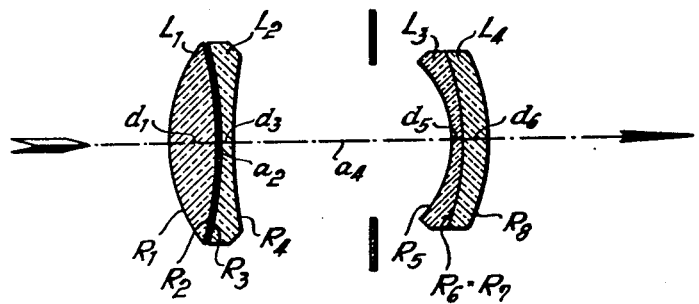

Example 2
(Fig. 2)

[Relative aperture 1:5,3.]

| | | | |
|---|---|---|---|
| $R_1 = +0.1721$ | $d_1 = 0.04565$ | $n_1 = 1.53939$ | $\nu_1 = 59.7$ |
| $R_2 = -0.4592$ | $a_2 = 0.00196$ | | |
| $R_3 = -0.4504$ | $d_3 = 0.01113$ | $n_2 = 1.66531$ | $\nu_2 = 35.8$ |
| $R_4 = +0.5789$ | $a_4 = 0.21404$ | diaphragm space | |
| $R_5 = -0.1076$ | $d_5 = 0.01015$ | $n_3 = 1.48660$ | $\nu_3 = 70.2$ |
| $R_6 = -0.2436$ | cemented | | |
| $R_7 = -0.2436$ | $d_6 = 0.02031$ | $n_4 = 1.66531$ | $\nu_4 = 35.8$ |
| $R_8 = -0.1958$ | | | |

Figure 3:
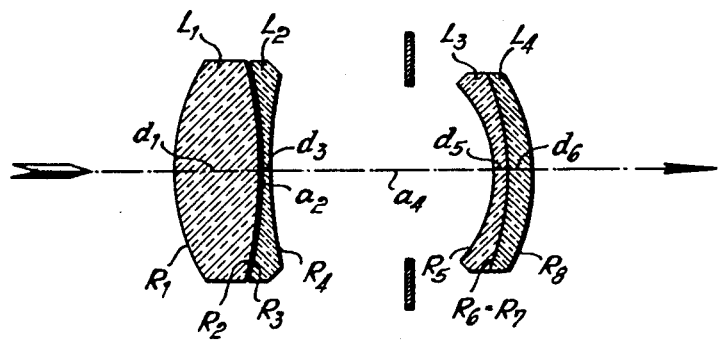

Example 3
(Fig. 3)

[Relative aperture 1:4,9.]

| | | | |
|---|---|---|---|
| $R_1 = +0.1919$ | $d_1 = 0.07799$ | $n_1 = 1.55230$ | $\nu_1 = 63.5$ |
| $R_2 = -0.4770$ | $a_2 = 0.00198$ | | |
| $R_3 = -0.4567$ | $d_3 = 0.01126$ | $n_2 = 1.66531$ | $\nu_2 = 35.8$ |
| $R_4 = +0.5881$ | $a_4 = 0.21750$ | diaphragm space | |
| $R_5 = -0.1135$ | $d_5 = 0.01027$ | $n_3 = 1.48660$ | $\nu_3 = 70.2$ |
| $R_6 = -0.2827$ | cemented | | |
| $R_7 = -0.2827$ | $d_6 = 0.02067$ | $n_4 = 1.66531$ | $\nu_4 = 35.8$ |
| $R_8 = -0.1990$ | | | |

Figure 4:
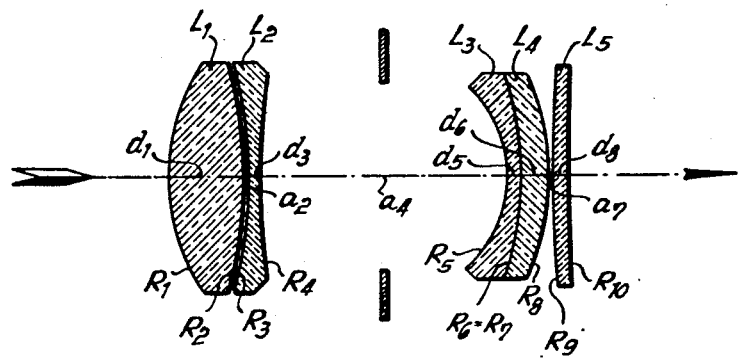

Example 4
(Fig. 4)

[Relative aperture 1:4,8.]

| | | | |
|---|---|---|---|
| $R_1 = +0.2048$ | $d_1 = 0.07215$ | $n_1 = 1.54771$ | $\nu_1 = 62.9$ |
| $R_2 = -0.5258$ | $a_2 = 0.00210$ | | |
| $R_3 = -0.5081$ | $d_3 = 0.01261$ | $n_2 = 1.66446$ | $\nu_2 = 35.9$ |
| $R_4 = +0.6522$ | $a_4 = 0.24153$ | diaphragm space | |
| $R_5 = -0.1214$ | $d_5 = 0.01156$ | $n_3 = 1.48749$ | $\nu_3 = 70.0$ |
| $R_6 = -0.3379$ | cemented | | |
| $R_7 = -0.3379$ | $d_6 = 0.02906$ | $n_4 = 1.66446$ | $\nu_4 = 35.9$ |
| $R_8 = -0.2172$ | $a_7 = 0.00245$ | | |
| $R_9 = +1.8157$ | $d_8 = 0.01541$ | $n_5 = 1.50048$ | $\nu_5 = 66.0$ |
| $R_{10} = +4.2511$ | | | |

The new objectives, according to the present invention, show the following structure:

The lens members, each of which consists of two lenses and which encloses the diaphragm space by surfaces which are concave toward the diaphragm, i. e. members $L_1$, $L_2$ and $L_3$, $L_4$, have the following characteristics:

$$L_1 \begin{cases} 0.15\,f < R_1 0 < .25\,f \\ 0.4\,f < -R_2 < 0.6\,f \\ \varphi_1 \text{ is positive; } n_1 \text{ is a low refractive index in the range between 1.45 and} \\ 1.58 \text{ for the } d\text{-line of the helium spectrum} \end{cases}$$

$$L_2 \begin{cases} 0.4\,f < -R_3 < 0.6\,f \\ 0.5\,f < R_4 < 0.7\,f \\ \varphi_2 \text{ is negative; } n_2 \text{ is a high refractive index in the range between 1.58} \\ \text{and 1.78 for the } d\text{-line of the helium spectrum} \end{cases}$$

$$0.18\,f < (a_4 \text{ diaphragm space}) < 0.29\,f$$

$$L_3 \begin{cases} 0.9\,f < -R_5 < 0.14\,f \\ 0.16\,f < -R_6 < 0.4\,f \\ \varphi_3 \text{ is negative; } n_3 \text{ is a low refractive index in the range between 1.45 and} \\ 1.58 \text{ for the } d\text{-line of the helium spectrum} \end{cases}$$

$$L_4 \begin{cases} 0.16\,f < -R_7 < 0.4\,f \\ 0.14\,f < -R_8 < 0.28\,f \\ \varphi_4 \text{ is positive; } n_4 \text{ is a high refractive index in the range between 1.58} \\ \text{and 1.78 for the } d\text{-line of the helium spectrum} \end{cases}$$

In the above expressions $\varphi_1$ to $\varphi_4$ stand for the successive refractive powers of the successive lenses $L_1$ to $L_4$, having the radii $R_1$ to $R_8$ in the direction of light and $f$ stands for the equivalent focal length. These refractice powers of the lenses are each the sum of the two surface powers of each lens, defined by $$\frac{n'-n}{R}$$

wherein R stands for the radius of this surface, $n$ stands for the refraction index of the medium in front of said radius and $n'$ stands for the refractive index behind said surface.

Within these characteristics, the new objectives are based on the following features of the present invention:

(A) *General principles.*—The photographic tele-objective according to the present invention has a two-lens front member which includes between a biconvex front lens and a subsequent biconcave lens, which limits the diaphragm space, a diverging pair of adjacent surfaces and is characterized by such a curvature of its two outer surfaces ($R_4$ to $R_1$) that (A₁) $$2.60 < \left(\frac{R_4}{R_1}\right) < 4.60$$

The front member is separated from the subsequent tele-negative system by an air space ($a_4$) which is characterized by the following condition:

(A₂) $$0.18\,f < a_4 < 0.29\,f$$

wherein $f$ denotes the equivalent focal length of the total objective.

(B) *Inventive features.*—The diaphragm space ($a_4$) is limited by a diverging pair of surfaces having the radii $R_4$, $R_5$. The sum of the lengths of the radii is in the following range:

(B₁) $$0.60\,f < (R_4 + |R_5|) < 0.80\,f$$

Simultaneously, the diverging front radius ($R_5$) of the negative meniscus lens, which follows the diaphragm, is curved relative to the radius of its converging back surface ($R_8$) in such a manner that the following condition is met:

(B₂) $$1.30 < \left(\frac{R_8}{R_5}\right) < 2.30$$

Simultaneously, the length of said radii is selected in such a manner that the sum of their absolute lengths meets the following condition:

(B₃) $$0.24\,f < (|R_5| + |R_8|) < 0.36\,f$$

Thereby the surfaces having these radii have such different refractive indices of the glasses, that the difference of the refractive indices for the yellow light of the helium-d-line meets the condition:

(B₄) $$0.135 < (n_4 - n_3) < 0.205$$

Thus, the two lenses $L_3$, $L_4$ include a likewise diverging pair of adjacent surfaces, because the lens, which is the second in the direction of the light, has a relatively very high refractive index with regard to the preceding first lens. This applies not only to this diverging tele-negative which meets the condition (B₅) $$1.6525 < n_4 < 1.6975$$

but also to the converging front member, in such a manner that additionally the following condition is met:

(B₆) $$1.6525 < \left(\frac{n_2 + n_4}{2}\right) < 1.6975$$

At the same time, the sum of the differences of refractive indices in the two enclosed diverging pairs of adjacent surfaces in the front member and rear member meets the following condition:

(B₇) $$0.245 < [(n_2 - n_1) + (n_4 - n_3)] < 0.345$$

The present invention consists in a combination of a simultaneous application of the structural features $B_1$, $B_2$, $B_3$ in connection with a distribution of the refractive numbers of the glasses to the lenses $L_1$ to $L_4$, according to the features $B_4$, $B_5$, $B_6$, $B_7$, to the specific type of the structural form of photographic tele-objectives which is described above in the general principles and characterized by the conditions $A_1$, $A_2$.

Therefore, the invention is not limited to the above described specific examples, and within the scope of the invention a great number of modifications and variations can be used, particularly also in the fine details of the new tele-objectives used in practice. Thus, for example, one or the other glass type can be used in the front member and in the rear member, in accordance with conventional practice. The tele-negative, the enclosed pair of adjacent surfaces of which, which is concave toward the diaphragm, and can be also uncemented and provided with differing radii of curvature, can be followed by an additional element (see Example 4) without leaving the scope of the present invention.

In the following tables the common inventive character of the new objectives is clearly shown:

| Example | $R_4$ | $R_1$ | Quotient $R_4/R_1$ |
|---|---|---|---|
| 1 | $R_4=0.6255$ | $R_1=0.1889$ | $R_4/R_1=3.3113$ |
| 2 | $R_4=0.5789$ | $R_1=0.1721$ | $R_4/R_1=3.3637$ |
| 3 | $R_4=0.5881$ | $R_1=0.1919$ | $R_4/R_1=3.0646$ |
| 4 | $R_4=0.6522$ | $R_1=0.2048$ | $R_4/R_1=3.1846$ |

These quotients of curvature of the front member are thus in the range between 2.60 and 4.60.

| Example | Air distance $a_4$ |
|---|---|
| 1 | $a_4=0.22206\,f$ |
| 2 | $a_4=0.21404\,f$ |
| 3 | $a_4=0.21750\,f$ |
| 4 | $a_4=0.24153\,f$ |

Thus, the values are in the range between $0.18\,f$ and $0.29\,f$.

| Example | $R_4$ | $|R_5|$ | Sum ($R_4+R_5$) |
|---|---|---|---|
| 1 | $R_4=0.6255\,f$ | $R_5=0.1103\,f$ | $R_4+R_5=0.7358\,f$ |
| 2 | $R_4=0.5789\,f$ | $R_5=0.1076\,f$ | $R_4+R_5=0.6865\,f$ |
| 3 | $R_4=0.5881\,f$ | $R_5=0.1135\,f$ | $R_4+R_5=0.7016\,f$ |
| 4 | $R_4=0.6522\,f$ | $R_5=0.1214\,f$ | $R_4+R_5=0.7736\,f$ |

Thus, these values are in the range between 0.60 $f$ and 0.80 $f$.

| Example | $R_8$ | $R_5$ | Quotient $R_8/R_5$ |
|---|---|---|---|
| 1 | $R_8=-0.1686$ | $R_5=-0.1103$ | $R_8/R_5=1.5286$ |
| 2 | $R_8=-0.1958$ | $R_5=-0.1076$ | $R_8/R_5=1.8197$ |
| 3 | $R_8=-0.1990$ | $R_5=-0.1135$ | $R_8/R_5=1.7533$ |
| 4 | $R_8=-0.2172$ | $R_5=0.1214$ | $R_8/R_5=1.7891$ |

The quotients of curvature of this composite negative are thus in the range between 1.30 and 2.30.

| Example | $|R_5|$ | $|R_8|$ | Sum $|R_5+R_8|$ |
|---|---|---|---|
| 1 | $R_5=0.1103f$ | $R_8=0.1686f$ | $R_5+R_8=0.2789f$ |
| 2 | $R_5=0.1076f$ | $R_8=0.1958f$ | $R_5+R_8=0.3034f$ |
| 3 | $R_5=0.1135f$ | $R_8=0.1990f$ | $R_5+R_8=0.3125f$ |
| 4 | $R_5=0.1214f$ | $R_8=0.2172f$ | $R_5+R_8=0.3386f$ |

The sum of radii is thus in the range between 0.24 $f$ and 0.36 $f$. in absolute values.

| Example | $n_4$ | $n_3$ | Difference $n_4-n_3$ |
|---|---|---|---|
| 1 | $n_4=1.67270$ | $n_3=1.52300$ | $n_4-n_3=0.14970$ |
| 2 | $n_4=1.66531$ | $n_3=1.48660$ | $n_4-n_3=0.17871$ |
| 3 | $n_4=1.66531$ | $n_3=1.48660$ | $n_4-n_3=0.17871$ |
| 4 | $n_4=1.66446$ | $n_3=1.48749$ | $n_4-n_3=0.17697$ |

Thus, the difference of refractive indices at the enclosed diverging pair of adjacent surfaces of the tele-negative is between 0.135 and 0.205.

| Example | $n_4$ |
|---|---|
| 1 | $n_4=1.67270$ |
| 2 | $n_4=1.66531$ |
| 3 | $n_4=1.66531$ |
| 4 | $n_4=1.66446$ |

Thus, the refractive index of the meniscus-shaped converging lens $L_4$ (which is concave toward the diaphragm) of the diverging tele-negative arranged on the side of the shorter conjugate is in the range between 1.6525 and 1.6975.

| Example | $n_2$ | $n_4$ | $n_{\text{Arithmetic mean}}$ |
|---|---|---|---|
| 1 | $n_2=1.64769$ | $n_4=1.67270$ | $\frac{n_2+n_4}{2}=1.660195$ |
| 2 | $n_2=1.66531$ | $n_4=1.66531$ | $\frac{n_2+n_4}{2}=1.66531$ |
| 3 | $n_2=1.66531$ | $n_4=1.66531$ | $\frac{n_2+n_4}{2}=1.66531$ |
| 4 | $n_2=1.66446$ | $n_4=1.66446$ | $\frac{n_2+n_4}{2}=1.66446$ |

Thus, the mean refractive index of these lenses $L_2$, $L_4$ (which are located as seconds in the direction of the light) is between 1.6525 and 1.6975.

| Example | $n_2-n_1$ | $n_4-n_3$ | Sum |
|---|---|---|---|
| 1 | $n_2-n_1=0.12469$ | $n_4-n_3=0.14970$ | $(n_2-n_1)+(n_4-n_3)=0.27439$ |
| 2 | $n_2-n_1=0.12592$ | $n_4-n_3=0.17871$ | $(n_2-n_1)+(n_4-n_3)=0.30463$ |
| 3 | $n_2-n_1=0.11301$ | $n_4-n_3=0.17871$ | $(n_2-n_1)+(n_4-n_3)=0.29172$ |
| 4 | $n_2-n_1=0.11675$ | $n_4-n_3=0.17697$ | $(n_2-n_1)+(n_4-n_3)=0.29372$ |

Thus, the sum of the differences of refractive indices at the two pairs of adjacent surfaces is in the range between 0.245 and 0.345.

It will be understood from the above that this invention is not limited to the specific designs, distances, curvatures and other details specifically described above and can be carried out with various modifications without departing from the scope of the invention as defined in the appended claims.

It will be understood that in the specification and claims the refractive numbers refer in all cases to the yellow helium line having a wave length of 5876 Angstrom units.

What is claimed is:

1. Photographic tele-objective comprising a two-lens front member which includes between a biconvex front lens and its subsequent biconcave lens, which limits the diaphragm space, a diverging pair of adjacent surfaces and has such a curvature of the two outer surfaces of said two-lens front member, that the following condition is met:

$$2.60 < \left(\frac{R_4}{R_1}\right) < 4.60$$

said front member being separated from the subsequently following tele-negative system by an air space which contains the diaphragm and meets the condition $$0.18\ f < a_4 < 0.29\ f$$

said diaphragm space being limited by a pair of diverging surfaces, the sum of radii of which meets the condition $$0.60\ f < (R_4+|R_5|) < 0.80\ f$$

whereby, simultaneously, the diverging front radius of the composite negative meniscus lens, which follows the diaphragm, is curved relative to its converging back surface in such a manner that the condition $$1.30 < \left(\frac{R_8}{R_5}\right) < 2.30$$

is met; the length of these two radii being simultaneously selected in such a manner that additionally the sum of their absolute lengths meets the condition $$0.24\ f < (|R_5|+|R_8|) < 0.36\ f$$

said surfaces having such radii being characterized by such refractive indices of the glasses that the difference of their refractive indices for the yellow light of the helium-$d$-line meets the condition $$0.135 < (n_4-n_3) < 0.205$$

so that these two lenses include a likewise diverging pair of adjacent surfaces because the lens, which is the second in the direction of light, has a relatively very high refractive index in comparison with the preceding lens, this characteristic being present in said diverging tele-negative which meets the condition $$1.6525 < n_4 < 1.6975$$

as well as in the converging front member in such a manner that additionally the condition $$1.6525 < \left(\frac{n_2+n_4}{2}\right) < 1.6975$$

is met and at the same time the sum of differences of the refractive indices at the two diverging pairs of adjacent surfaces in the front and rear member meets the condition $$0.245 < [(n_2-n_1)+(n_4-n_3)] < 0.345$$

wherein $R_1$ denotes the radius of the first, outer lens surface turned toward the longer conjugate, of the converging biconcave lens of the front member of the tele-objective; $R_4$ denotes the radius of the inner lens surface of the biconcave lens of said front member of the tele-objective; $R_5$ denotes the radius of the first, inner lens surface facing the diaphragm, of the first meniscus lens of the rear member of the tele-objective; $R_8$ denotes the radius of the outer lens surface of the second meniscus lens which directly follows said first meniscus lens in the direction of light, of the rear member of the tele-objective; $n_1$, $n_2$, $n_3$ and $n_4$ denote the successive refractive numbers for the yellow light of the helium $d$-line, of the biconvex front lens and the subsequent biconcave lens of the front member and of the first and second meniscus lens of the rear member of the tele-objective, respectively; and $f$ stands for the equivalent focal length.

2. Tele-objective according to claim 1, in which the two two-lens members which enclose the diaphragm space and are concave toward the diaphragm show the following characteristics:

$$L_1 \begin{cases} 0.15f < R_1 < 0.25f \\ 0.4f < -R_2 < 0.6f \\ \varphi_1 \text{ is positive; } n_1 \text{ is a low refraction index in the range between 1.45 and 1.58 for the } d\text{-line of the helium spectrum} \end{cases}$$

$$L_2 \begin{cases} 0.4f < -R_3 < 0.6f \\ 0.5f < R_4 < 0.7f \\ \varphi_2 \text{ is negative; } n_2 \text{ is a high refractive index in the range between 1.58 and 1.78 for the } d\text{-line of the helium spectrum} \end{cases}$$

$0.18f < (a_4 \text{ diaphragm space}) < 0.29f$ $$L_3 \begin{cases} 0.09f < -R_5 < 0.14f \\ 0.16f < -R_6 < 0.4f \\ \varphi_3 \text{ is negative; } n_3 \text{ is a low refractive index in the range between 1.45 and 1.58 for the } d\text{-line of the helium spectrum} \end{cases}$$

$$L_4 \begin{cases} 0.16f < -R_7 < 0.4f \\ 0.14f < -R_8 < 0.28f \\ \varphi_4 \text{ is positive; } n_4 \text{ is a high refractive index in the range between 1.58 and 1.78 for the } d\text{-line of the helium spectrum} \end{cases}$$

wherein $\varphi_1$ to $\varphi_4$ stand for the subsequent refractive powers of the subsequent lenses $L_1$ to $L_4$, having the radii $R_1$ to $R_8$ in the same direction of light and $f$ stands for the equivalent focal length.

3. Tele-objective as claimed in claim 2, the structural design of which has the following characteristics stated in round values:

| | | | |
|---|---|---|---|
| $R_1 = +0.19$ | $d_1 = 0.07$ | $n_1 = 1.523$ | $\nu_1 = 60$ |
| $R_2 = -0.47$ | $a_2 = 0.002$ | | |
| $R_3 = -0.47$ | $d_3 = 0.01$ | $n_2 = 1.648$ | $\nu_2 = 34$ |
| $R_4 = +0.63$ | $a_4 = 0.222$ | diaphragm space | |
| $R_5 = -0.11$ | $d_5 = 0.01$ | $n_3 = 1.523$ | $\nu_3 = 60$ |
| $R_6 = -0.20$ | cemented | | |
| $R_7 = -0.20$ | $d_6 = 0.03$ | $n_4 = 1.673$ | $\nu_4 = 32$ |
| $R_8 = -0.17$ | | | |

For $f = 1$, wherein $d_1$, $d_3$, $d_5$ and $d_6$ denote the thickness of successive lenses $L_1$, $L_2$, $L_3$, $L_4$, respectively; $a_2$ denotes the thickness of the air space between the successive lenses $L_1$ and $L_2$ and $a_4$ denotes the thickness of the diaphragm space; and $\nu_1$, $\nu_2$, $\nu_3$, $\nu_4$ denote the Abbe numbers of the successive lenses $L_1$, $L_2$, $L_3$ and $L_4$, respectively.

4. Tele-objective as claimed in claim 2, the structural design of which has the following characteristics stated in round values.

| | | | |
|---|---|---|---|
| $R_1 = +0.17$ | $d_1 = 0.05$ | $n_1 = 1.54$ | $\nu_1 = 60$ |
| $R_2 = -0.46$ | $a_2 = 0.002$ | | |
| $R_3 = -0.45$ | $d_3 = 0.01$ | $n_2 = 1.67$ | $\nu_2 = 36$ |
| $R_4 = +0.58$ | $a_4 = 0.214$ | diaphragm space | |
| $R_5 = -0.11$ | $d_5 = 0.01$ | $n_3 = 1.49$ | $\nu_3 = 70$ |
| $R_6 = -0.24$ | cemented | | |
| $R_7 = -0.24$ | $d_6 = 0.02$ | $n_4 = 1.67$ | $\nu_4 = 36$ |
| $R_8 = -0.20$ | | | |

For $f = 1$, wherein $d_1$, $d_3$, $d_5$ and $d_6$ denote the thickness of successive lenses $L_1$, $L_2$, $L_3$, $L_4$ respectively; $a_2$ denotes the thickness of the air space between the successive lenses $L_1$ and $L_2$ and $a_4$ denotes the thickness of the diaphragm space; and $\nu_1$, $\nu_2$, $\nu_3$, $\nu_4$ denote the Abbe numbers of the successive lenses $L_1$, $L_2$, $L_3$ and $L_4$, respectively.

5. Tele-objective as claimed in claim 2, the structural design of which has the following characteristics stated in round values:

| | | | |
|---|---|---|---|
| $R_1 = +0.19$ | $d_1 = 0.08$ | $n_1 = 1.55$ | $\nu_1 = 64$ |
| $R_2 = -0.48$ | $a_2 = 0.002$ | | |
| $R_3 = -0.46$ | $d_3 = 0.01$ | $n_2 = 1.67$ | $\nu_2 = 36$ |
| $R_4 = +0.59$ | $a_4 = 0.218$ | diaphragm space | |
| $R_5 = -0.11$ | $d_5 = 0.01$ | $n_3 = 1.49$ | $\nu_3 = 70$ |
| $R_6 = -0.28$ | cemented | | |
| $R_7 = -0.28$ | $d_6 = 0.02$ | $n_4 = 1.67$ | $\nu_4 = 36$ |
| $R_8 = -0.20$ | | | |

For $f = 1$, wherein $d_1$, $d_3$, $d_5$ and $d_6$ denote the thickness of successive lenses $L_1$, $L_2$, $L_3$, $L_4$, respectively; $a_2$ denotes the thickness of the air space between the successive lenses $L_1$ and $L_2$ and $a_4$ denotes the thickness of the diaphragm space; and $\nu_1$, $\nu_2$, $\nu_3$, $\nu_4$ denote the Abbe numbers of the successive lenses $L_1$, $L_2$, $L_3$ and $L_4$, respectively.

6. Tele-objective as claimed in claim 2 which comprises as an additional last lens member in the direction of light a lens having a front surface radius $R_9$, a rear surface radius $R_{10}$, a lens thickness of $d_8$, is spaced from the preceding lens at a distance $a_7$ and has a refractive number $n_5$, and the structural design of which has the following characteristics stated in round values:

| | | | |
|---|---|---|---|
| $R_1 = +0.20$ | $d_1 = 0.07$ | $n_1 = 1.55$ | $\nu_1 = 63$ |
| $R_2 = -0.53$ | $a_2 = 0.002$ | | |
| $R_3 = -0.51$ | $d_3 = 0.01$ | $n_2 = 1.66$ | $\nu_2 = 36$ |
| $R_4 = +0.65$ | $a_4 = 0.242$ | | |
| $R_5 = -0.12$ | $d_5 = 0.01$ | $n_3 = 1.49$ | $\nu_3 = 70$ |
| $R_6 = -0.34$ | cemented | | |
| $R_7 = -0.34$ | $d_6 = 0.03$ | $n_4 = 1.66$ | $\nu_4 = 36$ |
| $R_8 = -0.22$ | $a_7 = 0.002$ | | |
| $R_9 = +1.8$ | $d_8 = 0.02$ | $n_5 = 1.50$ | $\nu_5 = 66$ |
| $R_{10} = +4.3$ | | | |

For $f = 1$, wherein $d_1$, $d_3$, $d_5$, $d_6$ and $d_8$ denote the thicknesses of the successive lenses; $a_2$ denotes the thickness of the air space between the individual lenses of the front member of the tele-objective, and $a_4$ denotes the thickness of the diaphragm space and $\nu_1$, $\nu_2$, $\nu_3$, $\nu_4$, $\nu_5$ denote the Abbe numbers of the successive lenses in the direction of the light.

References Cited in the file of this patent
UNITED STATES PATENTS

| | | |
|---|---|---|
| 1,156,743 | Booth | Oct. 12, 1915 |
| 1,467,804 | Merte | Sept. 11, 1923 |
| 1,485,515 | Merte | Mar. 4, 1924 |
| 1,573,999 | Richter | Feb. 23, 1926 |
| 2,380,207 | Aklin | July 10, 1945 |
| 2,662,446 | Tronnier | Dec. 15, 1953 |